|||||||||||||||||||||||||||||||||||||||||||||||||
US011832684B2

(12) United States Patent
Hartmann

(10) Patent No.: US 11,832,684 B2
(45) Date of Patent: Dec. 5, 2023

(54) SHOE, IN PARTICULAR A SPORTS SHOE

(71) Applicant: PUMA SE, Herzogenaurach (DE)

(72) Inventor: Matthias Hartmann, Forchheim (DE)

(73) Assignee: PUMA SE, Herzogenaurach (DE)

( * ) Notice: Subject to any disclaimer, the term of this patent is extended or adjusted under 35 U.S.C. 154(b) by 0 days.

(21) Appl. No.: 17/042,681

(22) PCT Filed: Apr. 27, 2018

(86) PCT No.: PCT/EP2018/060995
§ 371 (c)(1),
(2) Date: Sep. 28, 2020

(87) PCT Pub. No.: WO2019/206435
PCT Pub. Date: Oct. 31, 2019

(65) Prior Publication Data
US 2021/0120912 A1   Apr. 29, 2021

(51) Int. Cl.
*A43B 13/18* (2006.01)
*A43B 5/00* (2022.01)
*A43B 13/04* (2006.01)

(52) U.S. Cl.
CPC .............. *A43B 13/181* (2013.01); *A43B 5/00* (2013.01); *A43B 13/04* (2013.01); *A43B 13/187* (2013.01)

(58) Field of Classification Search
CPC ......... A43B 13/181; A43B 5/00; A43B 13/04; A43B 13/187
See application file for complete search history.

(56) References Cited

U.S. PATENT DOCUMENTS

| D15,185 | S | 8/1884 | Brooks |
| 1,433,309 | A | 10/1922 | Stimpson |
| D79,583 | S | 10/1929 | Cutler |
| D84,646 | S | 7/1931 | Murray |
| D86,958 | S | 5/1932 | Hakim |
| D90,233 | S | 7/1933 | Daniels |
| D92,670 | S | 7/1934 | Murray |
| D97,945 | S | 12/1935 | Lutz |

(Continued)

FOREIGN PATENT DOCUMENTS

| CN | 2875129 Y | 3/2007 |
| CN | 201005124 Y | 1/2008 |

(Continued)

OTHER PUBLICATIONS

Hybrid NX Ozone Men's Running Shoes, Us.Puma.com, [online], [site visited Sep. 8, 2020]. <URL: https://us.puma.com/en/us/pd/hybrid-nx-ozone-mens-running-shoes/193384.html?dwvar_193384_color=06> (Year: 2020).

(Continued)

*Primary Examiner* — Heather Mangine
*Assistant Examiner* — Raquel M. Weis
(74) *Attorney, Agent, or Firm* — Quarles & Brady LLP

(57) ABSTRACT

The invention relates to a shoe (1), in particular a sports shoe, having an upper (2) and a sole (3) connected to said upper (2). In order to achieve good resilience properties of the sole of the shoe together with excellent wearing comfort, at least some areas of the sole (3) consist of a number of hollow bodies (4) embedded in a carrier material (5), wherein said carrier material (5) consists of a foamed plastic material.

11 Claims, 3 Drawing Sheets

(56) References Cited

U.S. PATENT DOCUMENTS

Figure 1:
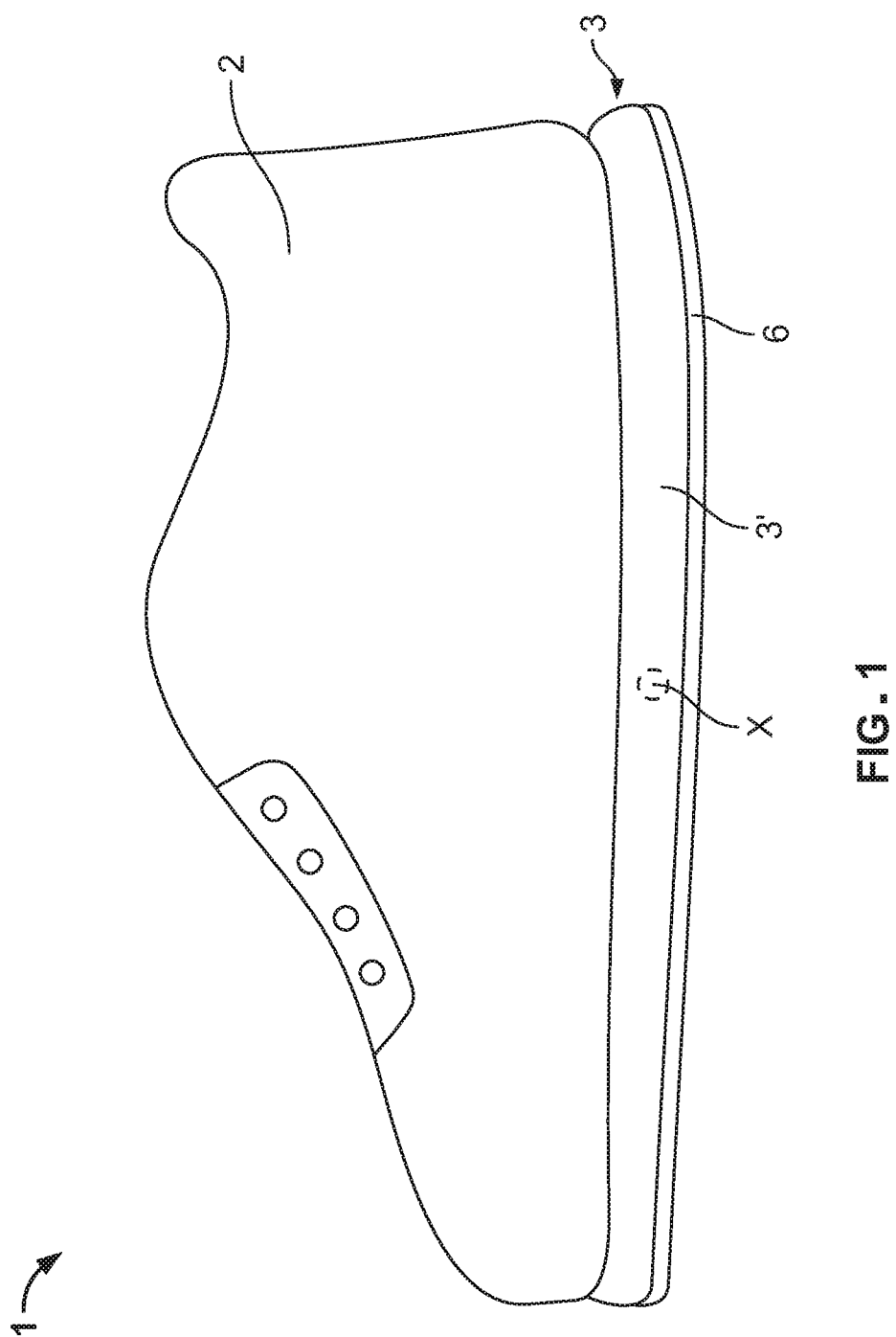

| | | | |
|---|---|---|---|
| 2,090,881 A * | 8/1937 | Wilson | A43C 15/168 |
| | | | 36/35 B |
| D132,621 S | 6/1942 | Ivan | |
| D161,031 S | 11/1950 | MacLeod | |
| 2,641,004 A | 6/1953 | Whiting et al. | |
| D171,331 S | 1/1954 | Haines et al. | |
| 2,682,712 A | 7/1954 | Owsen | |
| 3,087,262 A | 4/1963 | Russell | |
| D196,491 S | 10/1963 | Papoutsy | |
| D206,222 S | 11/1966 | Mostile | |
| 3,469,576 A * | 9/1969 | Everts | A43B 17/03 |
| | | | 36/154 |
| D216,246 S | 12/1969 | Mistarz | |
| 3,573,155 A | 3/1971 | Mitchell | |
| 3,629,051 A | 12/1971 | Mitchell | |
| 3,971,839 A * | 7/1976 | Taylor | B29C 67/00 |
| | | | 264/126 |
| D241,484 S | 9/1976 | Castano | |
| 4,089,069 A | 5/1978 | Vistins | |
| 4,112,599 A | 9/1978 | Krippelz | |
| D254,578 S | 4/1980 | Finn | |
| D255,171 S | 6/1980 | Bowers | |
| D255,178 S | 6/1980 | Fuzita | |
| D255,286 S | 6/1980 | Fuzita | |
| D256,067 S | 7/1980 | Hagg et al. | |
| D263,348 S | 3/1982 | Cohen | |
| D263,518 S | 3/1982 | Cohen | |
| D265,017 S | 6/1982 | Vermonet | |
| D265,019 S | 6/1982 | Vermonet | |
| D265,437 S | 7/1982 | Vermonet | |
| 4,345,387 A | 8/1982 | Daswick | |
| 4,399,620 A | 8/1983 | Funck | |
| D272,963 S | 3/1984 | Muller et al. | |
| D274,956 S | 8/1984 | Saruwatari | |
| 4,501,076 A | 2/1985 | Dodds | |
| 4,557,059 A | 12/1985 | Misevich et al. | |
| D287,902 S | 1/1987 | Forsyth | |
| 4,658,515 A * | 4/1987 | Oatman | A43B 17/14 |
| | | | 36/31 |
| D290,182 S | 6/1987 | Chen | |
| D293,271 S | 12/1987 | Lussier | |
| D293,275 S | 12/1987 | Bua | |
| D293,620 S | 1/1988 | Liggett et al. | |
| D295,917 S | 5/1988 | Brown et al. | |
| D296,039 S | 6/1988 | Diaz | |
| D296,149 S | 6/1988 | Diaz | |
| D296,954 S | 8/1988 | Tong | |
| D297,682 S | 9/1988 | Le | |
| D298,483 S | 11/1988 | Liggett et al. | |
| D298,582 S | 11/1988 | Caire | |
| D299,581 S | 1/1989 | Friedenberg | |
| 4,843,741 A * | 7/1989 | Yung-Mao | A43B 13/184 |
| | | | 36/114 |
| 4,845,863 A | 7/1989 | Yung-Mao | |
| 4,858,340 A | 8/1989 | Pasternak | |
| D304,520 S | 11/1989 | Clark | |
| D304,521 S | 11/1989 | Clark | |
| D305,382 S | 1/1990 | Kiyosawa | |
| D306,793 S | 3/1990 | Schwartz | |
| D307,971 S | 5/1990 | Maccano et al. | |
| D308,285 S | 6/1990 | Sema | |
| D310,293 S | 9/1990 | Sema et al. | |
| D310,295 S | 9/1990 | Boucher et al. | |
| D311,989 S | 11/1990 | Parker et al. | |
| 4,970,807 A * | 11/1990 | Anderie | A43B 13/181 |
| | | | 36/35 R |
| D312,920 S | 12/1990 | Aveni | |
| D313,113 S | 12/1990 | Aveni | |
| D319,535 S | 9/1991 | Hatfield | |
| D320,689 S | 10/1991 | Smith | |
| D321,589 S | 11/1991 | Merk et al. | |
| D321,973 S | 12/1991 | Hatfield | |
| D321,974 S | 12/1991 | Hatfield | |
| D324,762 S | 3/1992 | Hatfield | |
| D324,940 S | 3/1992 | Claveria | |
| 5,092,060 A | 3/1992 | Frachey et al. | |
| D328,815 S | 8/1992 | Legacki et al. | |
| D329,528 S | 9/1992 | Hatfield | |
| 5,150,490 A * | 9/1992 | Busch | A43B 17/14 |
| | | | 36/43 |
| D329,940 S | 10/1992 | Hatfield | |
| D330,454 S | 10/1992 | Elliot | |
| 5,152,081 A | 10/1992 | Hallenbeck et al. | |
| D330,627 S | 11/1992 | Frachey et al. | |
| D330,629 S | 11/1992 | Bramani | |
| 5,222,311 A | 6/1993 | Lin | |
| D337,650 S | 7/1993 | Thomas, III et al. | |
| D339,447 S | 9/1993 | McDonald | |
| D339,448 S | 9/1993 | Teague | |
| D339,454 S | 9/1993 | Hatfield | |
| D339,675 S | 9/1993 | Austin | |
| D339,906 S | 10/1993 | Frachey et al. | |
| D340,349 S | 10/1993 | Kilgore et al. | |
| D340,350 S | 10/1993 | Kilgore et al. | |
| D340,797 S | 11/1993 | Pallera et al. | |
| D341,700 S | 11/1993 | Avar | |
| D343,044 S | 1/1994 | Kilgore et al. | |
| 5,313,717 A | 5/1994 | Allen et al. | |
| 5,329,705 A | 7/1994 | Grim et al. | |
| D350,013 S | 8/1994 | Gitelman | |
| D350,222 S | 9/1994 | Hase | |
| 5,383,290 A * | 1/1995 | Grim | A43B 13/206 |
| | | | 36/88 |
| D356,438 S | 3/1995 | Opie et al. | |
| D356,885 S | 4/1995 | Poole, Jr. | |
| D362,956 S | 10/1995 | Martin et al. | |
| D365,920 S | 1/1996 | Schneider | |
| D366,955 S | 2/1996 | Valle | |
| D371,896 S | 7/1996 | McMullin | |
| D373,013 S | 8/1996 | Rosetta | |
| 5,542,195 A | 8/1996 | Sessa | |
| D373,896 S | 9/1996 | Parker | |
| 5,575,088 A | 11/1996 | Allen et al. | |
| 5,587,231 A * | 12/1996 | Mereer | B32B 27/42 |
| | | | 428/313.5 |
| 5,595,005 A | 1/1997 | Throneburg et al. | |
| 5,607,749 A | 3/1997 | Strumor | |
| D378,871 S | 4/1997 | Hatfield | |
| 5,617,650 A * | 4/1997 | Grim | A43B 7/147 |
| | | | 36/154 |
| 5,626,657 A * | 5/1997 | Pearce | A43B 5/0405 |
| | | | 523/105 |
| D384,794 S | 10/1997 | Merceron | |
| D386,589 S | 11/1997 | Cass | |
| D386,590 S | 11/1997 | Cass | |
| D386,591 S | 11/1997 | Kuerbis | |
| D387,546 S | 12/1997 | Pearce | |
| D389,991 S | 2/1998 | Elliott | |
| D390,349 S | 2/1998 | Murai et al. | |
| D391,045 S | 2/1998 | Assous | |
| D391,748 S | 3/1998 | Koh | |
| D393,299 S | 4/1998 | Hunt | |
| D395,738 S | 7/1998 | Hatfield et al. | |
| D396,341 S | 7/1998 | Lozano et al. | |
| D397,236 S | 8/1998 | Wilmot | |
| D398,740 S | 9/1998 | Hewett | |
| D398,748 S | 9/1998 | Hatfield et al. | |
| D399,041 S | 10/1998 | Teague | |
| D400,345 S | 11/1998 | Teaque | |
| D401,397 S | 11/1998 | Chen | |
| D401,743 S | 12/1998 | Wunsch | |
| D405,595 S | 2/1999 | Kayano | |
| D407,892 S | 4/1999 | Gaudio | |
| 5,890,248 A * | 4/1999 | Gee | B29D 35/10 |
| | | | 12/146 B |
| D411,579 S | 6/1999 | Dolinsky | |
| 5,909,719 A | 6/1999 | Throneburg et al. | |
| D414,920 S | 10/1999 | Cahill | |
| D415,607 S | 10/1999 | Merceron | |
| D415,610 S | 10/1999 | Cahill | |
| D415,876 S | 11/1999 | Cahill | |
| D416,669 S | 11/1999 | Parr et al. | |
| 5,996,252 A | 12/1999 | Cougar | |

(56) References Cited

U.S. PATENT DOCUMENTS

| | | | |
|---|---|---|---|
| D422,780 S | 4/2000 | Aguerre | |
| D423,199 S | 4/2000 | Cahill | |
| 6,061,928 A * | 5/2000 | Nichols | A43B 13/181 36/28 |
| D426,053 S | 6/2000 | Santa | |
| 6,076,283 A | 6/2000 | Boie | |
| D429,874 S | 8/2000 | Gumbert | |
| D431,346 S | 10/2000 | Birkenstock | |
| 6,127,010 A * | 10/2000 | Rudy | A43B 13/04 36/35 B |
| 6,187,837 B1 * | 2/2001 | Pearce | A43B 13/04 524/579 |
| D442,767 S | 5/2001 | Della Valle | |
| D444,620 S | 7/2001 | Della Valle | |
| 6,258,421 B1 * | 7/2001 | Potter | A43B 13/206 36/43 |
| D446,002 S | 8/2001 | Leong et al. | |
| D446,637 S | 8/2001 | Patterson et al. | |
| D448,544 S | 10/2001 | Della Valle | |
| 6,308,438 B1 | 10/2001 | Throneburg et al. | |
| 6,312,782 B1 * | 11/2001 | Goldberg | B29D 35/122 36/137 |
| 6,314,661 B1 | 11/2001 | Chern | |
| 6,341,432 B1 | 1/2002 | Muller | |
| D460,852 S | 7/2002 | Daudier | |
| 6,418,641 B1 | 7/2002 | Schenkel | |
| D461,299 S | 8/2002 | McClaskie | |
| D461,947 S | 8/2002 | Merceron | |
| D469,948 S | 2/2003 | Lin | |
| D470,296 S | 2/2003 | Masullo | |
| D474,330 S | 5/2003 | McClaskie | |
| D475,512 S | 6/2003 | Chen | |
| D479,643 S | 9/2003 | OShea et al. | |
| D482,851 S | 12/2003 | McClaskie | |
| D483,932 S | 12/2003 | Cooper | |
| D485,973 S | 2/2004 | Adams | |
| D489,880 S | 5/2004 | McClaskie | |
| D490,223 S | 5/2004 | McClaskie | |
| D490,233 S | 5/2004 | Cooper | |
| 6,739,074 B2 | 5/2004 | Trommer | |
| D492,101 S | 6/2004 | Issler | |
| D492,475 S | 7/2004 | Adams | |
| D494,343 S | 8/2004 | Morris | |
| 6,782,640 B2 * | 8/2004 | Westin | A43B 13/187 36/153 |
| D495,861 S | 9/2004 | Georgiou et al. | |
| D496,149 S | 9/2004 | Belley et al. | |
| 6,817,113 B2 | 11/2004 | Pan | |
| 6,848,200 B1 | 2/2005 | Westin | |
| D506,305 S | 6/2005 | Link | |
| D509,649 S | 9/2005 | McClaskie | |
| 6,948,264 B1 | 9/2005 | Lyden | |
| 6,957,504 B2 | 10/2005 | Morris | |
| D511,037 S | 11/2005 | Della Valle | |
| D511,610 S | 11/2005 | Della Valle | |
| D512,208 S | 12/2005 | Kubo et al. | |
| D513,836 S | 1/2006 | Magro et al. | |
| D515,297 S | 2/2006 | Acheson | |
| D522,740 S | 6/2006 | Dojan et al. | |
| 7,086,179 B2 | 8/2006 | Dojan et al. | |
| 7,086,180 B2 | 8/2006 | Dojan et al. | |
| 7,100,310 B2 | 9/2006 | Foxen et al. | |
| D532,599 S | 11/2006 | Dojan et al. | |
| D532,600 S | 11/2006 | Dojan et al. | |
| 7,141,131 B2 | 11/2006 | Foxen et al. | |
| D534,345 S | 1/2007 | Dojan et al. | |
| D538,017 S | 3/2007 | McClaskie | |
| D539,517 S | 4/2007 | Issler | |
| D540,517 S | 4/2007 | McClaskie | |
| D547,541 S | 7/2007 | Schindler et al. | |
| D548,435 S | 8/2007 | McClaskie | |
| D549,934 S | 9/2007 | Horne et al. | |
| D551,831 S | 10/2007 | Romero-Sanchez | |
| D551,833 S | 10/2007 | Feller | |
| D553,332 S | 10/2007 | McClaskie | |
| D556,982 S | 12/2007 | Harper et al. | |
| D560,883 S | 2/2008 | McClaskie | |
| D561,433 S | 2/2008 | McClaskie | |
| D564,736 S | 3/2008 | Belley et al. | |
| D566,934 S | 4/2008 | Della Valle | |
| D568,035 S | 5/2008 | McClaskie | |
| D570,581 S | 6/2008 | Polegato Moretti | |
| D571,085 S | 6/2008 | McClaskie | |
| D571,987 S | 7/2008 | Della Valle | |
| D572,440 S | 7/2008 | Polegato Moretti | |
| D572,441 S | 7/2008 | Moretti | |
| D572,442 S | 7/2008 | Polegato Moretti | |
| 7,401,420 B2 | 7/2008 | Dojan et al. | |
| D576,380 S | 9/2008 | Morris | |
| D576,780 S | 9/2008 | Jolicoeur | |
| 7,441,419 B1 | 10/2008 | Dollyhite et al. | |
| D586,090 S | 2/2009 | Turner et al. | |
| 7,484,318 B2 | 2/2009 | Finkelstein | |
| D590,140 S | 4/2009 | Della Valle | |
| D591,494 S | 5/2009 | Jolicoeur | |
| D591,938 S | 5/2009 | Beauger | |
| D595,489 S | 7/2009 | McClaskie | |
| D596,384 S | 7/2009 | Andersen et al. | |
| 7,555,847 B2 | 7/2009 | Kendall | |
| 7,555,848 B2 | 7/2009 | Aveni et al. | |
| 7,556,846 B2 | 7/2009 | Dojan et al. | |
| 7,559,107 B2 | 7/2009 | Dojan et al. | |
| 7,562,469 B2 | 7/2009 | Dojan | |
| D597,286 S | 8/2009 | Della Valle et al. | |
| D597,293 S | 8/2009 | Banik et al. | |
| D599,091 S | 9/2009 | Della Valle et al. | |
| D599,993 S | 9/2009 | Issler | |
| D601,333 S | 10/2009 | McClaskie | |
| D603,151 S | 11/2009 | Roundhouse | |
| D604,033 S | 11/2009 | Feldman | |
| D605,837 S | 12/2009 | Andersen et al. | |
| D607,190 S | 1/2010 | McClaskie | |
| D608,082 S | 1/2010 | Lemaster | |
| D608,997 S | 2/2010 | Loverin | |
| 7,662,468 B2 * | 2/2010 | Bainbridge | A41D 31/28 428/317.1 |
| 7,665,230 B2 | 2/2010 | Dojan et al. | |
| D610,788 S | 3/2010 | Della Valle | |
| D611,233 S | 3/2010 | Della Valle et al. | |
| 7,676,955 B2 | 3/2010 | Dojan et al. | |
| 7,676,956 B2 | 3/2010 | Dojan et al. | |
| 7,703,219 B2 | 4/2010 | Beck | |
| D616,183 S | 5/2010 | Skaja | |
| D616,640 S | 6/2010 | Werman | |
| D617,540 S | 6/2010 | McClaskie | |
| D620,695 S | 8/2010 | McCarthy et al. | |
| D624,291 S | 9/2010 | Henderson | |
| D625,499 S | 10/2010 | Della Valle et al. | |
| 7,805,859 B2 | 10/2010 | Finkelstein | |
| D626,321 S | 11/2010 | Cagner | |
| 7,841,108 B2 | 11/2010 | Johnson et al. | |
| D629,185 S | 12/2010 | Vico et al. | |
| D631,237 S | 1/2011 | Genuin et al. | |
| D631,646 S | 2/2011 | Muller | |
| D633,286 S | 3/2011 | Skaja | |
| D633,287 S | 3/2011 | Skaja | |
| D636,156 S | 4/2011 | Della Valle et al. | |
| D636,571 S | 4/2011 | Avar | |
| D637,803 S | 5/2011 | Alvear et al. | |
| D639,036 S | 6/2011 | Delavaldene et al. | |
| D639,535 S | 6/2011 | Eggert et al. | |
| 8,079,159 B1 | 12/2011 | Rosa | |
| D661,073 S | 6/2012 | Della Valle et al. | |
| D663,516 S | 7/2012 | Della Valle et al. | |
| D668,845 S | 10/2012 | Huynh | |
| D668,858 S | 10/2012 | Shaffer | |
| D671,305 S | 11/2012 | Escobar | |
| D671,306 S | 11/2012 | Tzenos | |
| 8,302,233 B2 | 11/2012 | Spanks et al. | |
| D674,171 S | 1/2013 | Bramani et al. | |
| D680,710 S | 4/2013 | Sundberg | |
| D683,119 S | 5/2013 | Shyllon | |
| D690,490 S | 10/2013 | Riddell | |

(56) References Cited

U.S. PATENT DOCUMENTS

| | | |
|---|---|---|
| D693,553 S | 11/2013 | McClaskie |
| D694,501 S | 12/2013 | Miner |
| D696,501 S | 12/2013 | Miner |
| D696,502 S | 12/2013 | Miner |
| D696,503 S | 12/2013 | Miner |
| D697,297 S | 1/2014 | McClaskie |
| 8,657,979 B2 | 2/2014 | Dojan et al. |
| 8,671,591 B2 | 3/2014 | Brown |
| D702,031 S | 4/2014 | Nakano |
| D707,934 S | 7/2014 | Petrie |
| D709,680 S | 7/2014 | Herath |
| D711,081 S | 8/2014 | Miner |
| D713,623 S | 9/2014 | Lo |
| D719,327 S | 12/2014 | Lindner et al. |
| D721,474 S | 1/2015 | Miner |
| D722,220 S | 2/2015 | Miner |
| D722,425 S | 2/2015 | Cin |
| 8,961,844 B2 | 2/2015 | Baghdadi et al. |
| D727,608 S | 4/2015 | Steven et al. |
| 9,009,991 B2 | 4/2015 | Sills |
| D730,638 S | 6/2015 | Christensen et al. |
| D731,763 S | 6/2015 | Solstad |
| D731,769 S | 6/2015 | Raysse |
| D734,600 S | 7/2015 | Gargiulo |
| D734,930 S | 7/2015 | Bikowski |
| 9,078,493 B2 | 7/2015 | Bradford |
| D737,548 S | 9/2015 | Levy |
| D738,078 S | 9/2015 | Raysse |
| D738,602 S | 9/2015 | Qin |
| D739,131 S | 9/2015 | Del Biondi |
| D739,132 S | 9/2015 | Del Biondi |
| 9,125,454 B2 | 9/2015 | De Roode et al. |
| D740,003 S | 10/2015 | Herath |
| D740,004 S | 10/2015 | Hoellmueller et al. |
| D746,559 S | 1/2016 | Besanceney et al. |
| D753,381 S | 4/2016 | Ostapenko |
| D756,085 S | 5/2016 | Spring |
| D756,620 S | 5/2016 | Boys |
| D758,056 S | 6/2016 | Galway et al. |
| D759,358 S | 6/2016 | Cullen |
| D765,361 S | 9/2016 | Johnsongriffin |
| D765,362 S | 9/2016 | Kuerbis |
| D767,263 S | 9/2016 | Reiser |
| D773,161 S | 12/2016 | Teteriatnikov |
| D773,790 S | 12/2016 | Raysse |
| D773,791 S | 12/2016 | Raysse |
| D776,410 S | 1/2017 | Galway et al. |
| D781,543 S | 3/2017 | Raysse |
| D782,793 S | 4/2017 | Truelsen |
| D783,247 S | 4/2017 | McMillan |
| D783,974 S | 4/2017 | McMillan |
| 9,610,746 B2 * | 4/2017 | Wardlaw .............. A43D 29/00 |
| D790,172 S | 6/2017 | Hatfield |
| D790,179 S | 6/2017 | McMillan |
| D790,181 S | 6/2017 | Parrett |
| 9,682,522 B2 | 6/2017 | Baghdadi et al. |
| D790,817 S | 7/2017 | Perkins et al. |
| D791,452 S | 7/2017 | Dombrow |
| D792,067 S | 7/2017 | Raysse |
| D793,053 S | 8/2017 | Cin |
| D793,680 S | 8/2017 | Lee |
| D793,687 S | 8/2017 | Cin |
| D793,688 S | 8/2017 | Avar et al. |
| D794,289 S | 8/2017 | Kanata |
| D794,300 S | 8/2017 | Rosen |
| 9,743,705 B2 | 8/2017 | Thomas et al. |
| D796,170 S | 9/2017 | Raysse |
| D796,172 S | 9/2017 | Henrichot et al. |
| D797,417 S | 9/2017 | Lee et al. |
| D797,418 S | 9/2017 | Lee et al. |
| D797,420 S | 9/2017 | Nykreim |
| D798,553 S | 10/2017 | Lee |
| D799,178 S | 10/2017 | James |
| D799,183 S | 10/2017 | Weeks |
| D800,433 S | 10/2017 | Kuerbis |
| D801,011 S | 10/2017 | Del Biondi et al. |
| D801,015 S | 10/2017 | Gibson |
| 9,775,769 B2 | 10/2017 | Brown et al. |
| 9,781,970 B2 * | 10/2017 | Wardlaw .............. A43B 13/187 |
| 9,781,974 B2 | 10/2017 | Reinhardt et al. |
| 9,788,598 B2 * | 10/2017 | Reinhardt .............. A43B 13/16 |
| 9,788,606 B2 | 10/2017 | Reinhardt et al. |
| 9,795,186 B2 | 10/2017 | Reinhardt et al. |
| D801,653 S | 11/2017 | Small |
| D802,261 S | 11/2017 | Stillwagon |
| D802,270 S | 11/2017 | Kirschner |
| 9,820,528 B2 | 11/2017 | Reinhardt et al. |
| D805,745 S | 12/2017 | Link |
| 9,849,645 B2 | 12/2017 | Wardlaw et al. |
| D808,143 S | 1/2018 | Negri |
| D809,755 S | 2/2018 | Stavseng et al. |
| D809,756 S | 2/2018 | Stavseng et al. |
| D809,761 S | 2/2018 | Parrett |
| D810,407 S | 2/2018 | DeAlmeida |
| D811,062 S | 2/2018 | Teague |
| 9,884,947 B2 | 2/2018 | Prissok et al. |
| D811,714 S | 3/2018 | Ngene |
| D812,882 S | 3/2018 | Jenkins et al. |
| D813,508 S | 3/2018 | Weeks |
| 9,907,365 B2 | 3/2018 | Downing et al. |
| 9,926,423 B2 | 3/2018 | Baghdadi |
| D814,752 S | 4/2018 | Ormsby |
| 9,930,928 B2 * | 4/2018 | Whiteman ........... A43B 13/188 |
| D816,958 S | 5/2018 | Cin et al. |
| 9,961,961 B2 | 5/2018 | Smith |
| 9,968,157 B2 | 5/2018 | Wardlaw et al. |
| D819,307 S | 6/2018 | Wurtz |
| D819,310 S | 6/2018 | Lashmore |
| D819,317 S | 6/2018 | Wurtz |
| D819,942 S | 6/2018 | Cin et al. |
| D823,583 S | 7/2018 | Petrie |
| 10,039,342 B2 | 8/2018 | Reinhardt et al. |
| D827,258 S | 9/2018 | Pina |
| D828,686 S | 9/2018 | Hoellmueller et al. |
| D828,984 S | 9/2018 | Gibson |
| D831,315 S | 10/2018 | Mahoney |
| D831,317 S | 10/2018 | Jenkins et al. |
| 10,098,411 B2 | 10/2018 | Hoffer et al. |
| 10,098,412 B2 | 10/2018 | Hoffer et al. |
| D833,129 S | 11/2018 | Fudalik |
| D834,801 S | 12/2018 | Ceniceros |
| 10,149,512 B1 | 12/2018 | Wurtz |
| D836,892 S | 1/2019 | Jenkins et al. |
| D836,893 S | 1/2019 | Bischoff et al. |
| D840,135 S | 2/2019 | Dombrow |
| D840,136 S | 2/2019 | Herath et al. |
| D840,137 S | 2/2019 | Herath et al. |
| 10,226,099 B2 | 3/2019 | Bischoff |
| 10,227,467 B2 | 3/2019 | Baghdadi |
| D844,952 S | 4/2019 | Taylor |
| D844,953 S | 4/2019 | Chen et al. |
| D846,255 S | 4/2019 | Khalife |
| D846,256 S | 4/2019 | Khalife |
| 10,259,183 B2 | 4/2019 | Wardlaw et al. |
| D847,475 S | 5/2019 | Khalife |
| D847,480 S | 5/2019 | Khalife |
| D848,715 S | 5/2019 | Holmes |
| D849,382 S | 5/2019 | Jenkins et al. |
| 10,279,581 B2 | 5/2019 | Ashcroft et al. |
| D850,083 S | 6/2019 | Jenkins et al. |
| D850,766 S | 6/2019 | Girard et al. |
| D851,889 S | 6/2019 | Dobson et al. |
| D852,475 S | 7/2019 | Hoellmueller |
| D852,476 S | 7/2019 | Hartmann |
| D853,094 S | 7/2019 | Young |
| D853,099 S | 7/2019 | Parrett |
| D853,690 S | 7/2019 | Taylor |
| D853,691 S | 7/2019 | Coonrod et al. |
| D853,699 S | 7/2019 | Coonrod et al. |
| D854,288 S | 7/2019 | Raasch |
| D854,294 S | 7/2019 | McMillan |
| D854,296 S | 7/2019 | Hardman |
| D854,297 S | 7/2019 | Hardman |
| D854,298 S | 7/2019 | Nethongkome |

(56) References Cited

U.S. PATENT DOCUMENTS

| | | |
|---|---|---|
| D855,297 S | 8/2019 | Motoki |
| D855,953 S | 8/2019 | Girard et al. |
| D856,650 S | 8/2019 | Schultze |
| D857,360 S | 8/2019 | Hardy |
| D858,051 S | 9/2019 | Mace |
| D858,960 S | 9/2019 | Mace |
| D858,961 S | 9/2019 | Mace |
| D859,801 S | 9/2019 | Jenkins et al. |
| D860,616 S | 9/2019 | Cran |
| D862,047 S | 10/2019 | Patillon et al. |
| D862,051 S | 10/2019 | Goussev et al. |
| D864,540 S | 10/2019 | Rosen |
| D866,137 S | 11/2019 | Kanata |
| D866,144 S | 11/2019 | Kanata |
| D867,734 S | 11/2019 | Dieudonne |
| D867,737 S | 11/2019 | Kanata |
| D868,440 S | 12/2019 | Dieudonne |
| D869,833 S | 12/2019 | Hartmann |
| D870,433 S | 12/2019 | Hartmann |
| D871,731 S | 1/2020 | Behr |
| D871,732 S | 1/2020 | Behr |
| D872,436 S | 1/2020 | Matthews |
| D872,437 S | 1/2020 | Matthews |
| D872,438 S | 1/2020 | Matthews |
| D873,545 S | 1/2020 | Hartmann |
| D874,098 S | 2/2020 | Hartmann |
| D874,099 S | 2/2020 | Hartmann |
| D874,107 S | 2/2020 | Girard |
| D874,801 S | 2/2020 | Hartmann |
| D875,358 S | 2/2020 | Vella |
| D875,360 S | 2/2020 | Vella |
| D875,361 S | 2/2020 | Girard |
| D875,362 S | 2/2020 | Girard |
| D875,383 S | 2/2020 | Mace |
| D876,052 S | 2/2020 | Hartmann |
| D876,055 S | 2/2020 | Hartmann |
| D876,063 S | 2/2020 | Matthews |
| D876,069 S | 2/2020 | Mace |
| D876,757 S | 3/2020 | Hartmann |
| D876,776 S | 3/2020 | Matthews |
| D876,791 S | 3/2020 | Gridley |
| D877,465 S | 3/2020 | Hartmann |
| D877,466 S | 3/2020 | Hartmann |
| D877,468 S | 3/2020 | Reyes |
| D878,015 S | 3/2020 | Hartmann et al. |
| D878,021 S | 3/2020 | Mace |
| D878,025 S | 3/2020 | Hartmann |
| D879,424 S | 3/2020 | Hartmann et al. |
| D879,430 S | 3/2020 | Gerig |
| D880,126 S | 4/2020 | Powers |
| D880,822 S | 4/2020 | Hartmann et al. |
| D880,825 S | 4/2020 | Garcia |
| D882,219 S | 4/2020 | Hartmann |
| D882,222 S | 4/2020 | Garcia |
| D882,227 S | 4/2020 | Braun et al. |
| D883,620 S | 5/2020 | Gridley |
| D883,621 S | 5/2020 | Garcia |
| D885,719 S | 6/2020 | Garcia |
| D885,721 S | 6/2020 | Williams |
| D885,722 S | 6/2020 | Le |
| D885,724 S | 6/2020 | Girard et al. |
| D887,112 S | 6/2020 | Mace |
| D887,113 S | 6/2020 | Girard et al. |
| D887,686 S | 6/2020 | Sogorb |
| D887,691 S | 6/2020 | Vella |
| D887,693 S | 6/2020 | Hartmann et al. |
| D889,788 S | 7/2020 | Yoshinaga et al. |
| D889,789 S | 7/2020 | Jenkins et al. |
| D889,815 S | 7/2020 | Mace |
| D890,485 S | 7/2020 | Perrault et al. |
| D890,488 S | 7/2020 | Vella |
| D890,496 S | 7/2020 | Le |
| D890,497 S | 7/2020 | Vella |
| D891,051 S | 7/2020 | Smith et al. |
| D891,053 S | 7/2020 | Dance |
| D891,054 S | 7/2020 | Dance |
| D891,738 S | 8/2020 | Garcia |
| D892,480 S | 8/2020 | Mace |
| D893,837 S | 8/2020 | Ni et al. |
| D893,838 S | 8/2020 | Le |
| D893,843 S | 8/2020 | Hartmann |
| D893,855 S | 8/2020 | Gridley |
| D894,572 S | 9/2020 | Lopez |
| D896,485 S | 9/2020 | Williams |
| D902,539 S | 11/2020 | Mace |
| D903,252 S | 12/2020 | Vella |
| D905,942 S | 12/2020 | Dance |
| D906,648 S | 1/2021 | Hoellmueller |
| D906,653 S | 1/2021 | Le |
| D907,344 S | 1/2021 | Hartmann |
| D907,903 S | 1/2021 | Garcia |
| D909,723 S | 2/2021 | Girard et al. |
| D909,739 S | 2/2021 | Toelle |
| D910,290 S | 2/2021 | Girard et al. |
| D910,291 S | 2/2021 | Zeng |
| D911,682 S | 3/2021 | Girard et al. |
| D911,683 S | 3/2021 | Girard et al. |
| D913,647 S | 3/2021 | Garcia |
| D913,654 S | 3/2021 | Dance |
| D916,444 S | 4/2021 | Callow et al. |
| D916,445 S | 4/2021 | Vella |
| D920,644 S | 6/2021 | Chipman |
| D920,645 S | 6/2021 | Chipman |
| D921,342 S | 6/2021 | Girard et al. |
| D922,042 S | 6/2021 | Girard et al. |
| D922,743 S | 6/2021 | Hardman |
| D928,479 S | 8/2021 | Le et al. |
| D930,961 S | 9/2021 | Le |
| D943,895 S | 2/2022 | Coonrod et al. |
| D944,504 S | 3/2022 | Dowling |
| D948,846 S | 4/2022 | Mace |
| D953,709 S | 6/2022 | Girard |
| D953,710 S | 6/2022 | Girard |
| D960,541 S | 8/2022 | Girard |
| 2003/0046831 A1* | 3/2003 | Westin ............... A43B 13/187 36/43 |
| 2003/0115691 A1 | 6/2003 | Mukherjee et al. |
| 2003/0208925 A1 | 11/2003 | Pan |
| 2004/0032042 A1* | 2/2004 | Chi ..................... A43B 9/125 264/316 |
| 2004/0148805 A1 | 8/2004 | Morris |
| 2004/0163280 A1 | 8/2004 | Morris |
| 2005/0022424 A1 | 2/2005 | Held |
| 2005/0110183 A1* | 5/2005 | Buchel ................ B29C 44/56 264/109 |
| 2005/0132608 A1 | 6/2005 | Dojan |
| 2005/0188562 A1 | 9/2005 | Clarke et al. |
| 2005/0193592 A1 | 9/2005 | Dua et al. |
| 2005/0229431 A1 | 10/2005 | Gerlin |
| 2006/0010717 A1* | 1/2006 | Finkelstein ......... A43B 13/187 36/43 |
| 2006/0021252 A1 | 2/2006 | Throneburg et al. |
| 2006/0026863 A1* | 2/2006 | Liu ..................... A43B 7/08 36/25 R |
| 2006/0130363 A1* | 6/2006 | Hottinger ............ A43B 13/125 36/11.5 |
| 2006/0175036 A1 | 8/2006 | Guerrero |
| 2006/0277788 A1* | 12/2006 | Fujii .................... A43B 17/02 36/28 |
| 2007/0011914 A1 | 1/2007 | Keen et al. |
| 2007/0094892 A1 | 5/2007 | Craig et al. |
| 2008/0005936 A1 | 1/2008 | Chiu |
| 2008/0066341 A1* | 3/2008 | Hottinger ............ A43B 13/04 36/28 |
| 2008/0110053 A1 | 5/2008 | Dominquez et al. |
| 2008/0148599 A1 | 6/2008 | Collins |
| 2008/0277837 A1* | 11/2008 | Liu ..................... B29C 45/345 264/497 |
| 2008/0307679 A1 | 12/2008 | Chiang et al. |
| 2009/0013558 A1 | 1/2009 | Hazenberg et al. |
| 2009/0313853 A1 | 12/2009 | Tadin |
| 2010/0005684 A1 | 1/2010 | Nishiwaki et al. |
| 2010/0242309 A1 | 9/2010 | McCann |

(56) References Cited

U.S. PATENT DOCUMENTS

| | | | |
|---|---|---|---|
| 2011/0016747 A1 | 1/2011 | Bitton | |
| 2011/0099845 A1* | 5/2011 | Miller | A43B 13/18 36/91 |
| 2011/0107622 A1 | 5/2011 | Schwirian | |
| 2011/0131832 A1* | 6/2011 | Brandt | B29C 51/267 36/29 |
| 2011/0232135 A1* | 9/2011 | Dean | B29D 35/142 156/60 |
| 2011/0252670 A1 | 10/2011 | Smith | |
| 2011/0283560 A1* | 11/2011 | Portzline | A43B 13/186 36/31 |
| 2012/0005920 A1 | 1/2012 | Alvear et al. | |
| 2012/0023784 A1 | 2/2012 | Goldston et al. | |
| 2012/0186107 A1 | 7/2012 | Crary et al. | |
| 2012/0204451 A1 | 8/2012 | De Roode et al. | |
| 2012/0210602 A1 | 8/2012 | Brown | |
| 2013/0126075 A1* | 5/2013 | Jiang | A43B 13/122 156/581 |
| 2013/0145653 A1* | 6/2013 | Bradford | A43B 13/42 36/103 |
| 2013/0227858 A1 | 9/2013 | James | |
| 2013/0247415 A1 | 9/2013 | Kohatsu | |
| 2013/0291409 A1* | 11/2013 | Reinhardt | B29D 35/142 36/43 |
| 2014/0068879 A1* | 3/2014 | Sussmann | A43B 13/125 12/146 B |
| 2014/0137434 A1 | 5/2014 | Craig | |
| 2014/0150292 A1 | 6/2014 | Podhajny et al. | |
| 2014/0151918 A1* | 6/2014 | Hartmann | B29D 35/122 264/46.5 |
| 2014/0223673 A1* | 8/2014 | Wardlaw | B29C 43/18 12/146 B |
| 2014/0223776 A1* | 8/2014 | Wardlaw | A43B 7/06 36/102 |
| 2014/0223777 A1 | 8/2014 | Whiteman et al. | |
| 2014/0243442 A1* | 8/2014 | Coles | B29C 35/0805 521/143 |
| 2014/0310986 A1 | 10/2014 | Tamm et al. | |
| 2015/0096203 A1 | 4/2015 | Brown et al. | |
| 2015/0196085 A1* | 7/2015 | Westmoreland | A43B 13/187 36/102 |
| 2015/0250256 A1 | 9/2015 | Podhajny | |
| 2015/0257481 A1 | 9/2015 | Campos et al. | |
| 2015/0342296 A1 | 12/2015 | Skaja et al. | |
| 2015/0344661 A1* | 12/2015 | Spies | C08G 18/14 521/137 |
| 2015/0351493 A1 | 12/2015 | Ashcroft et al. | |
| 2016/0007675 A1* | 1/2016 | Bier | A43B 23/0205 36/98 |
| 2016/0007676 A1 | 1/2016 | Leimer et al. | |
| 2016/0037859 A1* | 2/2016 | Smith | A43B 13/187 36/114 |
| 2016/0044992 A1* | 2/2016 | Reinhardt | A43B 13/16 36/31 |
| 2016/0128426 A1* | 5/2016 | Reinhardt | A43B 13/38 36/43 |
| 2016/0150855 A1* | 6/2016 | Peyton | A43B 13/20 36/29 |
| 2016/0227876 A1* | 8/2016 | Le | B29D 35/12 |
| 2016/0278481 A1* | 9/2016 | Le | A43B 13/125 |
| 2016/0295955 A1* | 10/2016 | Wardlaw | A43B 13/181 |
| 2016/0302527 A1 | 10/2016 | Meir | |
| 2016/0311993 A1* | 10/2016 | Zhang | C08K 3/22 |
| 2016/0374428 A1 | 12/2016 | Kormann et al. | |
| 2017/0006958 A1* | 1/2017 | Jeong | A43B 13/125 |
| 2017/0020228 A1 | 1/2017 | Scofield et al. | |
| 2017/0253710 A1* | 9/2017 | Smith | E04B 1/84 |
| 2017/0259474 A1* | 9/2017 | Holmes | A43B 13/04 |
| 2017/0303635 A1 | 10/2017 | Kazarian | |
| 2017/0341325 A1* | 11/2017 | Le | B29D 35/0063 |
| 2017/0341326 A1* | 11/2017 | Holmes | A43B 13/04 |
| 2017/0341327 A1* | 11/2017 | Le | A43D 117/00 |
| 2017/0354568 A1 | 12/2017 | Brown et al. | |
| 2018/0000197 A1 | 1/2018 | Wardlaw et al. | |
| 2018/0035755 A1 | 2/2018 | Reinhardt et al. | |
| 2018/0055137 A1 | 3/2018 | Fraser et al. | |
| 2018/0055144 A1* | 3/2018 | Bischoff | B29D 35/122 |
| 2018/0064210 A1 | 3/2018 | Turner et al. | |
| 2018/0077997 A1* | 3/2018 | Hoffer | A43B 13/206 |
| 2018/0092432 A1 | 4/2018 | Hoffer et al. | |
| 2018/0100049 A1 | 4/2018 | Prissok et al. | |
| 2018/0103719 A1* | 4/2018 | Chen | B29D 35/0009 |
| 2018/0103725 A1 | 4/2018 | Chen | |
| 2018/0132487 A1 | 5/2018 | Kormann et al. | |
| 2018/0153252 A1 | 6/2018 | Archer et al. | |
| 2018/0153264 A1 | 6/2018 | Amos et al. | |
| 2018/0154598 A1 | 6/2018 | Kurtz et al. | |
| 2018/0168281 A1 | 6/2018 | Case et al. | |
| 2018/0199667 A1 | 7/2018 | Wang | |
| 2018/0206591 A1 | 7/2018 | Whiteman et al. | |
| 2018/0206599 A1 | 7/2018 | Amos et al. | |
| 2018/0213886 A1 | 8/2018 | Connell et al. | |
| 2018/0235310 A1 | 8/2018 | Wardlaw et al. | |
| 2018/0271211 A1 | 9/2018 | Perrault et al. | |
| 2018/0271213 A1 | 9/2018 | Perrault et al. | |
| 2018/0289108 A1 | 10/2018 | Hoffer et al. | |
| 2018/0296821 A1 | 10/2018 | Ho | |
| 2018/0303197 A1 | 10/2018 | Chen et al. | |
| 2018/0303198 A1 | 10/2018 | Reinhardt et al. | |
| 2018/0317591 A1 | 11/2018 | Hollinger | |
| 2018/0317600 A1 | 11/2018 | Campos et al. | |
| 2018/0317603 A1 | 11/2018 | Gronlykke | |
| 2018/0338573 A1* | 11/2018 | Cross | A43B 13/141 |
| 2018/0338575 A1 | 11/2018 | Elder et al. | |
| 2018/0352900 A1 | 12/2018 | Hartmann et al. | |
| 2019/0029363 A1 | 1/2019 | Lucca | |
| 2019/0069633 A1 | 3/2019 | Lucca | |
| 2019/0069634 A1 | 3/2019 | Lucca | |
| 2019/0126580 A1 | 5/2019 | Paulson et al. | |
| 2019/0133251 A1 | 5/2019 | Hartmann et al. | |
| 2019/0150564 A1 | 5/2019 | Bischoff | |
| 2019/0216167 A1 | 7/2019 | Hoffer et al. | |
| 2019/0216168 A1 | 7/2019 | Hoffer et al. | |
| 2019/0223539 A1 | 7/2019 | Hoffer et al. | |
| 2019/0223550 A1 | 7/2019 | Levy | |
| 2019/0223551 A1 | 7/2019 | Hoffer et al. | |
| 2019/0269200 A1 | 9/2019 | Tseng | |
| 2019/0283394 A1 | 9/2019 | Ashcroft et al. | |
| 2019/0343225 A1 | 11/2019 | Reddy | |
| 2020/0008518 A1 | 1/2020 | Souyri et al. | |
| 2020/0046068 A1 | 2/2020 | Choi | |
| 2020/0060383 A1 | 2/2020 | Le | |
| 2020/0077741 A1 | 3/2020 | Hurd | |
| 2020/0093221 A1 | 3/2020 | Caldwell et al. | |
| 2020/0107608 A1 | 4/2020 | Uzzeni | |
| 2020/0170342 A1 | 6/2020 | Uzzeni | |
| 2020/0375307 A1 | 12/2020 | Hurd | |
| 2021/0022443 A1 | 1/2021 | Hoffer et al. | |

FOREIGN PATENT DOCUMENTS

| | | |
|---|---|---|
| CN | 101484033 A | 7/2009 |
| CN | 201767147 U | 3/2011 |
| CN | 102366199 A | 3/2012 |
| CN | 103298362 A | 9/2013 |
| CN | 103717658 A | 4/2014 |
| CN | 103976505 A | 8/2014 |
| CN | 104470393 A | 3/2015 |
| CN | 105982390 A | 10/2016 |
| CN | 107048590 A | 8/2017 |
| CN | 107849286 A | 3/2018 |
| CN | 207186082 U | 4/2018 |
| CN | 108366644 A | 8/2018 |
| DE | 102010046278 A1 | 2/2011 |
| DE | 102011108744 A1 | 1/2013 |
| EM | 001286116-0005 | 7/2011 |
| EM | 002219956-0024 | 4/2013 |
| EM | 002772764-0015 | 9/2015 |
| EM | 003039619-0034 | 3/2016 |
| EM | 003330174-0003 | 3/2016 |
| EM | 003165984-0005 | 6/2016 |
| EM | 003315555-0001 | 7/2016 |

(56) References Cited

FOREIGN PATENT DOCUMENTS

| | | |
|---|---|---|
| EM | 003316389-0001 | 7/2016 |
| EM | 003344076-0002 | 8/2016 |
| EM | 003362672-0001 | 9/2016 |
| EM | 003522580-0029 | 12/2016 |
| EM | 003649060-0005 | 1/2017 |
| EM | 003649540-0001 | 1/2017 |
| EM | 003718311-0019 | 1/2017 |
| EM | 003761089-0028 | 2/2017 |
| EM | 003761113-0025 | 2/2017 |
| EM | 004352755-0004 | 9/2017 |
| EM | 004363935-0008 | 9/2017 |
| EM | 004366326-0001 | 9/2017 |
| EM | 004386571-0002 | 10/2017 |
| EM | 004543882-0008 | 12/2017 |
| EM | 004675411-0006 | 1/2018 |
| EM | 004812501-0004 | 3/2018 |
| EM | 005841939-0004 | 3/2018 |
| EM | 005191004-0010 | 4/2018 |
| EM | 005243227-0002 | 4/2018 |
| EM | 005260023-0003 | 5/2018 |
| EM | 005278413-0002 | 5/2018 |
| EM | 005320371-0002 | 6/2018 |
| EM | 005612025-0001 | 8/2018 |
| EM | 006335345-0003 | 3/2019 |
| EP | 0383685 A1 | 8/1990 |
| EP | 1738889 A1 | 1/2007 |
| EP | 1979401 B1 | 9/2010 |
| EP | 2649896 A2 | 10/2013 |
| EP | 2786670 A1 | 10/2014 |
| EP | 2984956 A1 | 2/2016 |
| EP | 3027377 A1 | 6/2016 |
| EP | 3041892 A1 | 7/2016 |
| EP | 2649896 B1 | 10/2016 |
| EP | 3078287 A1 | 10/2016 |
| EP | 3114959 A1 | 1/2017 |
| EP | 3186306 A1 | 7/2017 |
| EP | 2467037 B1 | 10/2017 |
| EP | 2872309 B1 | 11/2017 |
| EP | 3289907 A1 | 3/2018 |
| EP | 3308663 A1 | 4/2018 |
| EP | 3338581 A1 | 6/2018 |
| EP | 3352607 A1 | 8/2018 |
| EP | 3352608 A1 | 8/2018 |
| EP | 3352610 A1 | 8/2018 |
| EP | 3352611 A1 | 8/2018 |
| EP | 3352612 A1 | 8/2018 |
| EP | 3352615 A1 | 8/2018 |
| EP | 3338984 A3 | 9/2018 |
| EP | 3248770 B1 | 5/2019 |
| EP | 3476237 A1 | 5/2019 |
| EP | 3386334 B1 | 7/2019 |
| FR | 2709047 A1 | 2/1995 |
| JP | 10248610 A | 9/1998 |
| JP | 1146806 | 2/1999 |
| JP | 2000316606 A | 11/2000 |
| JP | 2002535468 A | 10/2002 |
| JP | 2004161987 A | 6/2004 |
| JP | 2007185353 A | 7/2007 |
| JP | 2011177206 A | 9/2011 |
| JP | 2013536707 A | 9/2013 |
| JP | 2014151210 A | 8/2014 |
| JP | 2015077475 A | 4/2015 |
| JP | 2015513354 A | 5/2015 |
| JP | 2018535767 A | 12/2018 |
| KR | 1020140025298 A | 3/2014 |
| KR | 101550222 B1 | 9/2015 |
| WO | 9929203 A1 | 6/1999 |
| WO | 0078171 A1 | 12/2000 |
| WO | 0101806 A1 | 1/2001 |
| WO | 2005066250 A1 | 7/2005 |
| WO | 2006066256 A2 | 6/2006 |
| WO | 2007024523 A1 | 3/2007 |
| WO | 2007082838 A1 | 7/2007 |
| WO | 20070139832 A2 | 12/2007 |
| WO | 2008003375 A1 | 1/2008 |
| WO | 2010010010 A1 | 1/2010 |
| WO | 2016030026 A1 | 3/2016 |
| WO | 2016030333 A1 | 3/2016 |
| WO | 2017053650 A1 | 3/2017 |
| WO | 2017053654 A1 | 3/2017 |
| WO | 2017053658 A1 | 3/2017 |
| WO | 2017053665 A1 | 3/2017 |
| WO | 2017053669 A1 | 3/2017 |
| WO | 2017053674 A1 | 3/2017 |
| WO | 2017/097315 A1 | 6/2017 |
| WO | 2018099833 A1 | 6/2018 |
| WO | 2018103811 A1 | 6/2018 |
| WO | DM102274 | 7/2018 |
| WO | 2018169535 A1 | 9/2018 |
| WO | 2018169537 A1 | 9/2018 |
| WO | 2018175734 A1 | 9/2018 |
| WO | DM103418 | 10/2018 |
| WO | 2019029781 A1 | 2/2019 |
| WO | 2019073607 A1 | 4/2019 |
| WO | 2019101339 A1 | 5/2019 |
| WO | 2019150492 A1 | 8/2019 |

OTHER PUBLICATIONS

Hybrid Astro Men's Running Shoes, Us.Puma.com, [online], [site visited Sep. 8, 2020]. <URL: https://us.puma.com/en/us/pd/hybrid-astro-mens-running-shoes/192799.html?dwvar_192799_color=07> (Year: 2020).

Second Office Action from corresponding Chinese Patent Application No. 201780093796.1 dated Aug. 25, 2021 (11 pages) (English translation included).

International Search Report for PCT/EP2017/000972, dated Oct. 25, 2017 (1 page).

First Office Action with First Search issued in corresponding Chinese Application No. 201580085133.6, dated Apr. 13, 2020, 15 pages.

Office Action from corresponding Indian Application No. 201817021054 dated Nov. 10, 2021 (English translation Included) (5 pages).

Office Action from corresponding Korean Application No. 10-2018-7016199 dated Dec. 22, 2021 (English translation included) (13 pages).

Office Action from corresponding Chinese Patent Application No. 201780093796.1, dated Jan. 27, 2021 (7 pages) (English translation unavailable).

Nike Addresses Joyride Comparisons to Puma's Jamming Tech, SoleCollector.com, by Riley Jones, Aug. 7, 2019, 4 pages, [online], [site visited Sep. 4, 2019]. <URL: https://solecollector.com/news/2019/08/nike-addresses-joyride-comprisons-puma-jamming> (Year: 2019).

Nike Unveils Joyride Running Shoes in Latest Cushioning Experiment, SI.com, by Chris Chavez, Jul. 25, 2019, 5 pages, [online], [site visited Sep. 4, 2019].<URL: https://www.si.com/edge/2019/07/25/nike-jpyride-technology-sushioning-beaded-tpe-foam-rubber-details> (Year: 2019).

Puma Jamming—NRGY Beeds Shoe Review, YouTube.com, Tiffany Beers, Published on Jul. 21, 2018, 1 page, [online], [site visited Sep. 4, 2019]. <URL: https://www.youtube.com/watch?v=4ZS7NDY0RNc> (Year: 2018).

First Office Action from corresponding Chinese Patent Application No. 201880090530.6 dated Jun. 3, 2021 (13 pages) (English translation included).

First Office Action from corresponding Japanese Patent Application No. 2020-546945 dated Nov. 2, 2021 (8 pages) (English translation included).

Adidas Mega Soft Cell, BX Sports's Weblog, Published on Aug. 6, 2010, [online], [site visited Jul. 29, 2019]. <URL: https://bx97.wordpress.com/2010/08/06/adidas-mega-soft-cell-2/> (Year: 2010).

Small beads for long distances, BASF, Published on Aug. 13, 2013, [online], [site visited Aug. 1, 2019]. <URL: https://www.basf.com/global/documents/en/news-and-media/science-around-us/small-beads-for-long-distances/BASF_Science_around_us_Infinergy.pdf> (Year: 2013).

(56) References Cited

OTHER PUBLICATIONS

Zaleski, Andrew, "Who's Winning the 3D-Printed Shoe Race?" Fortune.com; Published on Dec. 15, 2015 [online] [site visited Aug. 6, 2019] <URL: https://fortune.com/2015/12/15/3d-printed-shoe-race/> (Year 2015), pp. 1-12.
Schlemmer, Zack, "New Balance Trailbuster Fresh Foam Drops in Two Monochrome Colorways," Sneaker News; Published on Apr. 22, 2017 [online] [site visited Aug. 6, 2019] <URL: https://sneakernews.com/2017/04/22/new-balance-trailbuster-fresh-foam-drops-black-white/> (Year 2017), pp. 1-8.
International Search Report (with English translation) and Written Opinion issued in International Application No. PCT/EP2015/002456, dated Oct. 25, 2016, 17 pages.
Adidas' FutureCraft Loop Sneaker Talks a Big Recycling Game, Gizmodo, Published on Apr. 17, 2019, 10 pages, [online], [site visited Sep. 5, 2019]. <URL: https://gizmodo.com/adidas-futurecraft-loop-sneaker-talks-a-big-recycling-1834086618> (Year: 2019).
Ben Felderstein "Puma to Debut New Jamming Cushion on Nov. 9" © 2007-2019 Sneaker News Inc, Nov. 7, 2017, 7 pages, [online], [site visited Jul. 23, 2019] <URL: https://sneakernews.com/2017/11/07/puma-jamming-cushion-release-info/> (Year 2017).
Cruise Down the Streets in the Distinctive Puma Hybrid Runner, RunnersWorld.com, by Amanda Furrer, Jul. 2, 2018, 11 pages, [online], [site visited Jul. 26, 2019]. <URL: https://www.runnersworld.com/gear/a21987976/puma-hybrid-runner-shoe-review/> (Year: 2018).
Did Nike Not Get the Memo on Plastic Beads?, Gizmodo, Published on Jul. 25, 2019, 7 pages, [online], [site visited Sep. 5, 2019]. <URL: https://earther.gizmodo.com/did-nike-not-get-the-memo-on-plastic-beads-1836694806> (Year: 2019).
Puma Jamming NRGY Shoe Unboxing /Review+ on Feet, YouTube.com, Published on Dec. 21, 2017, 1 page, [online], [site visited Jul. 26, 2019]. <URL: https://www.youtube.com/watch?v=rpCmRWeDbj8> (Year: 2017).
The beads that move with you, PUMA Catch up, Published on Nov. 9, 2017, 6 pages, [online], [site visited Sep. 5, 2019]. <URL: https://www.puma-catchup.com/jamming-pumas-new-sole-technology-ultimate-comfort/> (Year: 2017).
The Puma Jamming Introduces New Cushioning Technology, Sneakers-Magazine.com, Posted Nov. 9, 2017, 3 pages, [online], [site visited Jul. 26, 2019]. <URL: https://sneakers-magazine.com/puma-jamming-nrgy-beads/> (Year: 2017).
Notice of Reasons of Refusal issued in corresponding Japanese Application No. 2018-526089, dated Jun. 30, 2020, 11 pages.
International Search Report of International Application No. PCT/EP2018/060995, dated Jan. 17, 2019, 3 pages.
First Office Action from corresponding Chinese Patent Application No. 201880100006.2 dated Jan. 7, 2022 (16 pages) (English translation included).

\* cited by examiner

SHOE, IN PARTICULAR A SPORTS SHOE

This application is a U.S. National Stage application, filed pursuant to 35 U.S.C. § 371, of international application no. PCT/EP2018/060995, filed on Apr. 27, 2018, the contents of which is incorporated herein by reference in its entirety.

The invention relates to a shoe, in particular to a sports shoe, having an upper and a sole connected to said upper, wherein at least some areas of the sole consist of a number of hollow bodies embedded in a carrier material, wherein said carrier material consists of a foamed plastic material.

A shoe of the generic type is disclosed in US 2011/131832 A1 and in EP 1 738 889 A1. Other solutions show U.S. Pat. No. 6,127,010 A, WO 2007/139832 A2 and U.S. Pat. No. 6,258,421 B1.

Shoes of this type are regularly required to design the sole in such a way that it is comfortable to wear but still has good spring and cushioning properties. In particular, good restoring properties of the sole are desired hereby (also known as the "rebound" effect).

Based on a large number of previously known solutions, the present invention is based on the object of providing a generic shoe which is further improved in this respect, i. e. which in particular has good spring-back or restoring properties.

The solution of this object by the invention is characterized in that the material of the hollow bodies is expanded thermoplastic polyurethane (E-TPU).

The plastic material used as the carrier material preferably exhibits visco-elastic behaviour. It preferably consists of polyurethane or at least has this material. Visco-elasticity is the occurrence of partial elastic and viscous material behaviour under mechanical stress. In contrast to metallic materials, where this behaviour can only be observed at greatly increased temperatures, the visco-elastic behaviour of plastics already occurs at room temperature and thus has a strong practical influence on the stiffness, strength, deformation and toughness behaviour of these materials.

The plastic material used as the carrier material has preferably a density between 0.15 and 0.35 g/cm$^3$.

The plastic material used as the carrier material has preferably a hardness between 25 and 40 Asker C.

The hollow bodies have preferably a spherical or ellipsoidal shape. They can also have an elongated and in the end regions rounded, in particular hemispherical shape. The largest dimension of a hollow body is thereby preferably between 4 mm and 10 mm, specifically preferred between 6 and 8 mm. The wall thickness of a hollow body is preferably between 0.3 mm and 1.2 mm, specifically preferred between 0.5 mm and 1.0 mm.

The sole consisting of hollow bodies and carrier material has preferably a volume fraction of hollow bodies which is between 25% and 75%, specifically preferred between 30% and 50% (each measured without external loads on the sole).

The sole consisting of hollow bodies and carrier material can thereby be designed as a midsole under which an outsole is arranged.

The shoe is specifically preferred designed as a jogging shoe.

The upper of the shoe can generally be designed as desired. Classic textiles or leather or imitation leather materials can be used. Knitted materials are also possible. If the shoe upper is made of knitted material, it is also possible to design it like a sock and to connect it to the sole. In this case the shoe upper is then designed as a one-piece, preferably seamless, knitted part. Circular knitting machines can be used for this purpose, with which an all-round closed knitted fabric can be produced.

Of course, there are also other possibilities by which the shoe upper can be produced. As explained above, it can be envisaged that the upper of the shoe is produced in the classical way, whereby the lower part, which runs underneath the sole of the wearer's foot, is for example a strobel sole which can be sewn to the upper. This can be done in particular in combination with a knitted upper part of the shoe upper.

The shoe upper can be attached to the sole part by sewing and/or gluing, for example.

With regard to the urethane-based thermoplastic elastomer mentioned above, explicit reference is made to WO 2010/010010 A1, in which an expandable, blowing agent-containing thermoplastic polymer blend is disclosed, which contains thermoplastic polyurethane and styrene polymer.

It has been shown that when a shoe, especially a sports shoe, is designed in the manner specified above, very advantageous and comfortable wearing properties of the shoe can be achieved with regard to the compression behaviour of the shoe and its recovery properties (after removal of the compressive force by the wearer's foot).

With regard to the visco-elastic behaviour of the material used as the carrier material, it should be noted that this can achieve a favourable distribution of pressure on the foot of the wearer of the shoe, avoiding pressure points. This material adapts rather slowly to the foot; this does not result in an immediate springback of the material. Examples of visco-elastic materials are visco-elastic foams such as ethylene vinyl acetate (EVA) and polyurethane (PU). EVA and PU are lightweight and stable foam materials that have viscous and elastic qualities. Due to the soft and elastic material it adapts optimally to the foot. Another advantageous property of these visco-elastic foams is that they return to their original shape without stress.

The above mentioned hardness according to Asker C is sufficiently known to the man skilled in the art, for which reference is made to the standards SRIS 0101 and ABNT NBR 14455.

In the drawings an embodiment of the invention is shown.

Figure 2:
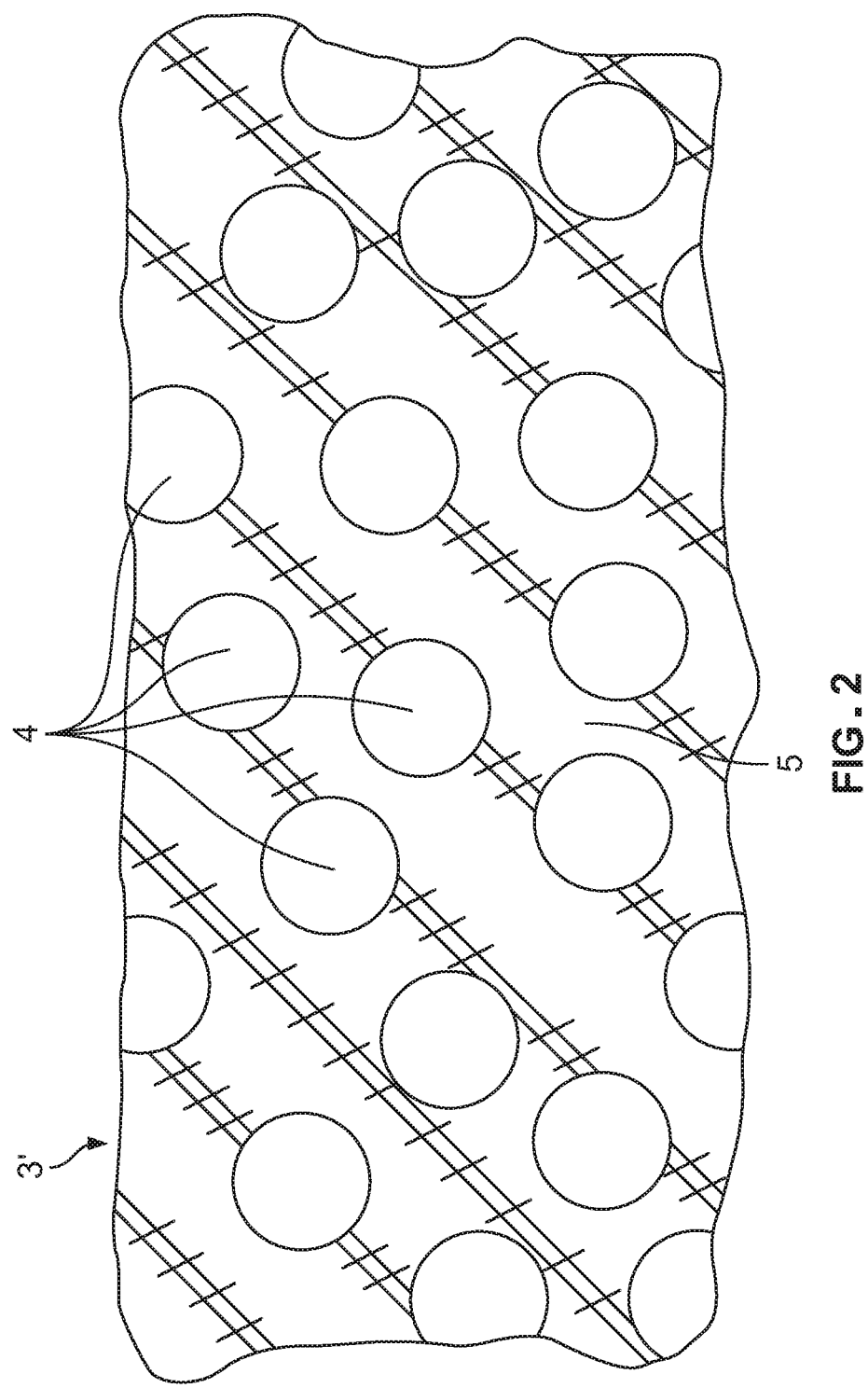
Figure 5:
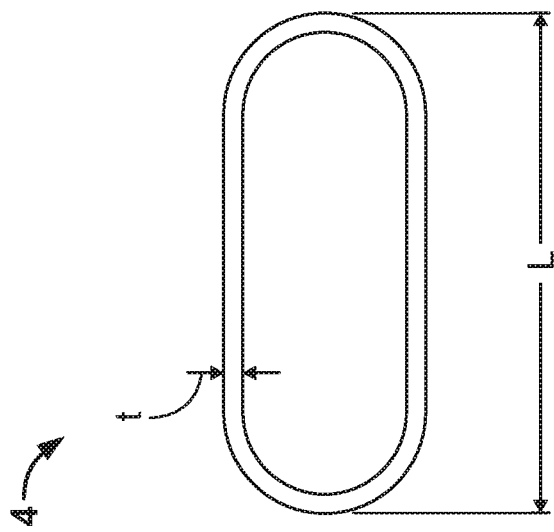
Figure 4:
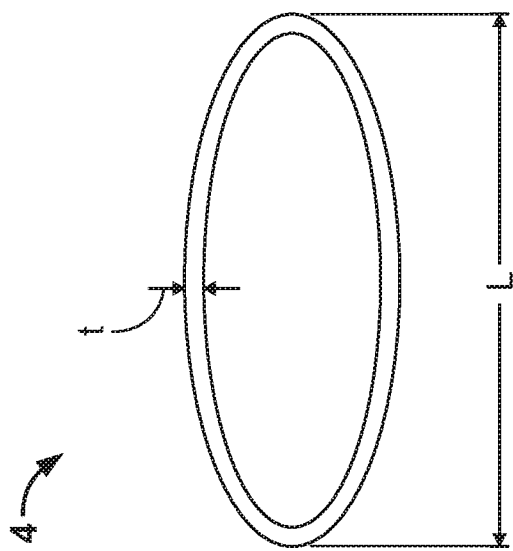
Figure 3:
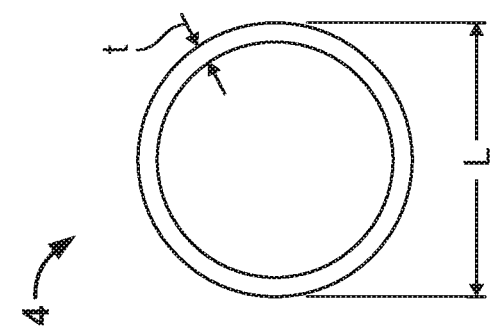

FIG. 1 shows schematically a shoe in side view,

FIG. 2 shows schematically a section through a part of the midsole of the shoe as shown in FIG. 1, namely detail "X", FIG. 3 shows a hollow body which is part of the sole, wherein the hollow body is in the form of a sphere, FIG. 4 shows an alternative design of the hollow body to FIG. 3 as an ellipsoid and FIG. 5 shows another alternative of the hollow body as shown in FIG. 3 as an elongated element.

FIG. 1 shows a shoe 1 in the form of a running shoe (jogging shoe) comprising an upper 2 and a sole 3. The sole 3 is connected to the upper 2, for example by an adhesive bond. In the shown embodiment the sole 3 consists of a midsole 3', under which an outsole 6 is arranged, which is bonded to the midsole 3', for example by means of a glue joint.

The midsole 3' is made of a material composition as illustrated in FIG. 2. Accordingly, it is intended that the midsole 3' consists of a number of hollow bodies 4 embedded in a carrier material 5. Thereby, the carrier material 5 consists of a foamed plastic.

The hollow bodies 4 are shown in FIG. 2 as hollow spherical bodies. Reference is made insofar to FIG. 3, where such a hollow body 4 is shown in the form of a hollow sphere. The largest dimension, here thus in the form of the diameter of the sphere, is denoted with L. The hollow body 4 has a wall thickness t.

Alternative designs of the hollow bodies are shown in FIGS. 4 and 5. In FIG. 4 the hollow body 4 is designed as an ellipsoid, in FIG. 5 as an elongated body, which is designed as a hemispherical shape in its end areas.

The hollow bodies 4 can be produced by injection moulding, blow moulding or laser sintering, for example.

The surface of the hollow bodies can be partially open or completely closed. If the hollow body is closed, it preferably contains air. The hollow bodies 4 are characterised, among other things, by the fact that they exhibit a strongly non-linear progression of the deformation force over the deformation during compression. Accordingly, the hollow body 4 can be deformed or compressed relatively easily to a certain degree, but above a certain level of deformation the resistance to further deformation increases sharply, i.e. it is now more difficult to deform the hollow body further.

This behaviour can be very advantageous for cushioning systems in the field of sports and here especially for shoe soles (also midsoles and insoles).

After removal of the external force, the hollow bodies 4 completely resume their original shape.

The hollow bodies 4 can be produced by welding or by using microwaves by joining two hemispheres or half-shells together. Circular webs can form at the joint, which can have a positive effect on the stiffness in the desired manner.

The combination of the proposed hollow bodies 4 with the carrier material 5 made of the respective materials mentioned above has the very advantageous consequence that the sole, especially and preferably the midsole, which is made of this combination of materials, has (by the use of the hollow bodies 4) a good recovery or springback characteristic, but nevertheless (by the use of the carrier material 5) allows a high wearing comfort of the shoe.

The relatively soft material (in the form of polyurethane foam) intended for the carrier material 5 ensures the high wearing comfort of the shoe. Meanwhile, the hollow bodies 4 provided the desired "rebound effect", so that the sole, especially in the form of the midsole, has a good restoring effect.

The above-mentioned hardnesses of the materials are selected in such a way that the desired effect is shown to its best advantage.

Thus, the proposed shoe, especially designed as a running shoe (jogging shoe), has optimal usage properties in terms of the above mentioned object.

REFERENCE NUMERALS

1 Shoe
2 Upper
3 Sole
3' Midsole
4 Hollow body
5 Carrier material
6 Outsole
L Largest dimension of the hollow body
t Wall thickness of the hollow body

The invention claimed is:

1. A shoe, comprising:
an upper; and
a sole connected to the upper, the sole comprising a midsole and an outsole, wherein a plurality of hollow bodies are provided within the midsole, the hollow bodies being embedded within a carrier material,
wherein the carrier material consists of foamed polyurethane having a density of between 0.15 g/cm$^3$ and 0.35 g/cm$^3$, and a hardness of between 25 Asker C and 40 Asker C,
wherein the hollow bodies define an internal volume within the midsole of between 25% and 75% of a total volume of the midsole,
wherein the hollow bodies define outer surfaces that completely encase respective internal cavities,
wherein the internal cavity of each of the hollow bodies contains air, and
wherein at least one of the plurality of hollow bodies has a spherical or ellipsoidal shape, the largest dimension of the at least one hollow body being between 4.0 mm and 10 mm, and the wall thickness of the at least one hollow body being between 0.3 mm and 1.2 mm.

2. The shoe of claim 1, wherein the hollow bodies comprise expanded thermoplastic polyurethane (E-TPU).

3. The shoe of claim 1, wherein the plurality of hollow bodies are spherical.

4. The shoe of claim 1, wherein the hollow bodies are produced by injection moulding, blow moulding, or laser sintering.

5. The shoe of claim 1, wherein the hollow bodies define the internal volume within the midsole of between 30% and 50% of the total volume of the midsole.

6. The shoe of claim 1, wherein the plastic material used as carrier material has visco-elastic behaviour.

7. The shoe of claim 1, wherein the hollow bodies have an elongated shape.

8. The shoe of claim 1, wherein the hollow bodies take up between 25% and 75% of a volume of the sole.

9. The shoe of claim 1, wherein the sole is designed as the midsole under which the outsole is arranged.

10. The shoe of claim 1, wherein the shoe is designed as a jogging shoe.

11. The shoe of claim 1, wherein the hollow bodies comprise expanded thermoplastic polyurethane (E-TPU).

* * * * *